US011120190B2

(12) United States Patent
Schultz

(10) Patent No.: US 11,120,190 B2
(45) Date of Patent: Sep. 14, 2021

(54) METAL ZERO POWER GROUND STUB ROUTE TO REDUCE CELL AREA AND IMPROVE CELL PLACEMENT AT THE CHIP LEVEL

(71) Applicant: Advanced Micro Devices, Inc., Sunnyvale, CA (US)

(72) Inventor: Richard T. Schultz, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 55 days.

(21) Appl. No.: 15/819,879

(22) Filed: Nov. 21, 2017

(65) Prior Publication Data

US 2019/0155979 A1 May 23, 2019

(51) Int. Cl.
| | |
|---|---|
| *G06F 30/392* | (2020.01) |
| *H01L 27/02* | (2006.01) |
| *H01L 23/528* | (2006.01) |
| *G06F 30/39* | (2020.01) |
| *G06F 30/394* | (2020.01) |
| *G06F 30/398* | (2020.01) |

(Continued)

(52) U.S. Cl.
CPC ............ *G06F 30/392* (2020.01); *G06F 30/39* (2020.01); *G06F 30/394* (2020.01); *G06F 30/398* (2020.01); *H01L 23/5286* (2013.01); *H01L 27/0207* (2013.01); *G06F 2119/06* (2020.01); *G06F 2119/18* (2020.01)

(58) Field of Classification Search
CPC ............ H01L 23/5286; H01L 27/0207; G06F 17/5068–5081
See application file for complete search history.

(56) References Cited

U.S. PATENT DOCUMENTS

| | | |
|---|---|---|
| 5,889,329 A | 3/1999 | Rostoker et al. |
| 9,837,398 B1 | 12/2017 | Rowhani et al. |

(Continued)

FOREIGN PATENT DOCUMENTS

WO 2007073599 A1 7/2007

OTHER PUBLICATIONS

International Search Report and Written Opinion in International Application No. PCT/US2018/052369, dated Jan. 7, 2019, 16 pages.

(Continued)

*Primary Examiner* — Stephen M Bradley
(74) *Attorney, Agent, or Firm* — Rory D. Rankin; Kowert, Hood, Munyon, Rankin & Goetzel, P.C

(57) ABSTRACT

A system and method for laying out power grid connections for standard cells are described. In various embodiments, a standard cell includes power post and ground posts in metal zero. The metal zero posts include no vias to any upper metal layers. Some variations of the standard cell have the power and ground posts routed in metal zero to a boundary edge of the standard cell. Layout rules are changed to allow this type of routing. The power and ground posts in metal zero are connected to power and ground posts in metal zero of a neighboring cell by abutment. The place-and-route tool doesn't need to perform a further routing step after placing the cells. For other variations, the power and ground posts are not routed to the boundary edge and the place-and-route tool routes power and ground connections in metal zero between the standard cell and the neighbor cell.

20 Claims, 6 Drawing Sheets

(51) Int. Cl.
*G06F 119/06* (2020.01)
*G06F 119/18* (2020.01)

(56) References Cited

U.S. PATENT DOCUMENTS

| | | |
|---|---|---|
| 2005/0212562 A1 | 9/2005 | Gliese et al. |
| 2007/0157144 A1 | 7/2007 | Mai et al. |
| 2007/0278528 A1 | 12/2007 | Ato et al. |
| 2009/0187871 A1 | 7/2009 | Cork |
| 2010/0148219 A1 | 6/2010 | Shimizu |
| 2013/0087834 A1 | 4/2013 | Park et al. |
| 2013/0126978 A1* | 5/2013 | Becker ............... H01L 27/0924 257/369 |
| 2013/0155753 A1 | 6/2013 | Moon et al. |
| 2013/0334613 A1* | 12/2013 | Moroz ................ G06F 17/5072 257/401 |
| 2014/0145342 A1 | 5/2014 | Schultz et al. |
| 2014/0264742 A1 | 9/2014 | Yen |
| 2016/0276287 A1 | 9/2016 | Iwabuchi |
| 2017/0011999 A1 | 1/2017 | Heo |
| 2017/0154848 A1 | 6/2017 | Fan et al. |
| 2017/0352649 A1* | 12/2017 | Pant ....................... H01L 23/535 |
| 2018/0090440 A1 | 3/2018 | Schultz et al. |
| 2018/0183414 A1* | 6/2018 | Guo ................... H03K 3/356121 |
| 2019/0065650 A1 | 2/2019 | Pelloie |
| 2019/0103394 A1* | 4/2019 | Andrews ............. H01L 23/5329 |

OTHER PUBLICATIONS

Shultz, Richard T., U.S. Appl. No. 15/965,311, entitled "Metal Zero Contact Via Redundancy on Output Nodes and Inset Power Rail Architecture", filed Apr. 27, 2018, 36 pages.

Notice of Allowance in U.S. Appl. No. 15/965,311, dated Jun. 5, 2019, 8 pages.

Final Office Action in U.S. Appl. No. 15/275,028, dated May 16, 2019, 12 pages.

International Search Report and Written Opinion in International Application No. PCT/US2017/052775, dated Mar. 26, 2018, 17 pages.

Non-Final Office Action in U.S. Appl. No. 15/275,028, dated Sep. 28, 2018, 10 pages.

* cited by examiner

METAL ZERO POWER GROUND STUB ROUTE TO REDUCE CELL AREA AND IMPROVE CELL PLACEMENT AT THE CHIP LEVEL

BACKGROUND

Description of the Relevant Art

As both semiconductor manufacturing processes advance and on-die geometric dimensions reduce, semiconductor chips provide more functionality and performance while consuming less space. While many advances have been made, design issues still arise with modern techniques in processing and integrated circuit design that limit potential benefits. For example, capacitive coupling, electromigration, leakage currents and processing yield are some issues which affect the placement of devices and the routing of signals across an entire die of a semiconductor chip. Thus, these issues have the potential to delay completion of the design and affect the time to market.

In order to shorten the design cycle for semiconductor chips, manual full-custom designs are replaced with automation where possible. A designer provides a description of a functional unit or a complex gate in a high-level description language such as Verilog, VHDL and so on. A synthesis tool receives the logic description and provides the logical netlist. The logical netlist is used by a place-and-route (PNR) tool to provide physical layout. The place-and-route tool uses a cell layout library to provide the physical layout.

The cell layout library includes multiple standard cell layouts for providing the various functionalities used by the semiconductor chip. In some cases, a standard cell layout is created manually. Therefore, each new standard cell layout or each original standard cell layout being modified is created manually. In other cases, the rules used by the place-and-route tool are adjusted to automate the cell creation. However, the automated process at times does not satisfy each of the rules directed at performance, power consumption, signal integrity, process yield, both local and external signal routing including internal cross coupled connections, height and width cell dimensions matching other cells, pin access, power rail design and so on. Therefore, designers manually create these cells to achieve better results for the multiple characteristics or rewrite the rules for the place-and-route tool.

Generally, the standard cell layouts use at least one power rail for the supply voltage connections also referred to as the VDD power rail and one power rail for the ground connections also referred to as the VSS power rail. In some cases, the power and ground rails use relatively long wires utilizing multiple metal layers such as horizontal metal zero, vertical metal one, horizontal metal two and vertical metal three in addition to the corresponding vias. In other cases, fixed location posts are used within the standard cell to make the power and ground connections.

Before the power and ground connections are created, some layout cells in the layout cell library need to be expanded to create space for the connections and satisfy the multiple design rule checks (DRCs). Expanding the cell layouts increases the on-die area consumed by these cells. When a significant portion of the chip design uses these cells, the overall chip area significantly increases.

In view of the above, efficient methods and systems for laying out power grid connections for standard cells are desired.

BRIEF DESCRIPTION OF THE DRAWINGS

The advantages of the methods and mechanisms described herein may be better understood by referring to the following description in conjunction with the accompanying drawings, in which.

Figure 1:
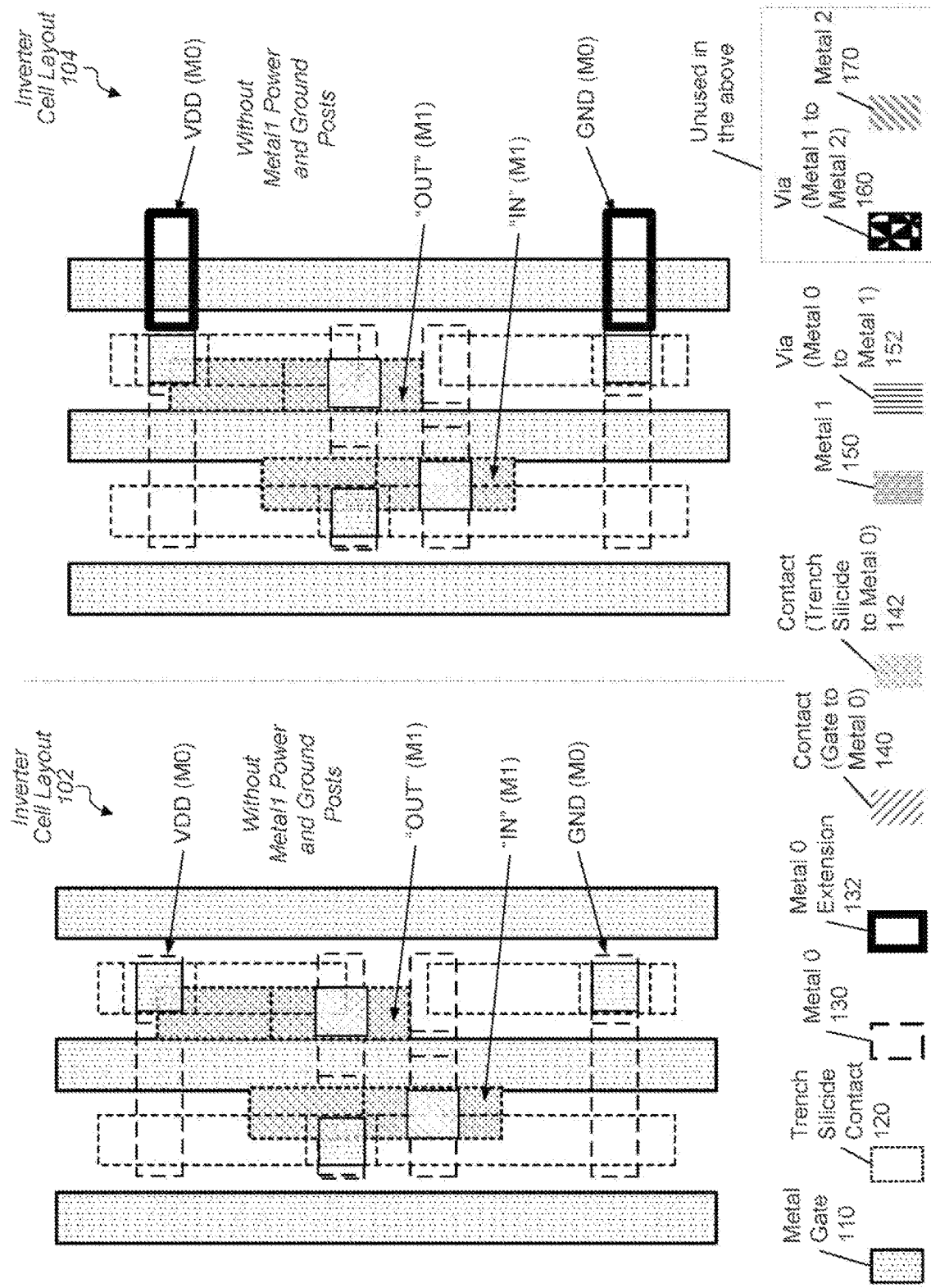
FIG. 1 is a generalized diagram of top views of standard cell layouts for inverters.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems and methods for laying out power grid connections for standard cells are contemplated. In various embodiments, a cell includes one or more input nodes in metal one, one or more output nodes in metal one, and each of a power post and a ground reference post in metal zero below the posts in metal one. In an embodiment, the cell is a standard cell in a cell layout library. In another embodiment, the cell is a custom cell created for a particular area of a chip design. The power and ground posts include no vias to any upper metal layers. In some embodiments, the power and ground posts are routed in metal zero to a boundary edge of the cell. Layout rules are changed to allow this type of routing. The power and ground posts in metal zero are connected to power and ground posts in metal zero of a neighboring cell by abutment. The place-and-route tool doesn't need to perform a further routing step after placing the cells.

In other embodiments, the power and ground connections are routed in metal zero to a threshold distance from the boundary edge of the cell. The place-and-route tool places the cell next to a neighbor cell with power and ground posts in metal zero aligned with the tracks of the power and ground posts in metal zero in the cell. The place-and-route tool routes metal zero, rather than metal two, between the cell and the neighbor cell after placement. In various embodiments, cells chosen to have power and ground posts in metal zero with no vias to any upper metal layers include cells with a number of metal gates less than a sum of the one or more input nodes, the one or more output nodes and the power and ground connections.

Referring to FIG. 1, generalized block diagrams of top views of cell layout 102 and cell layout 104 are shown. Here, the active regions are not shown in the cell layouts 102 and 104 for ease of illustration. In the illustrated embodiment, shown on the left is cell layout 102 for an inverter without placement of metal one (Metal1 or M1) posts for a power and ground connections. Cell layout 102 has an input pin labeled as "IN" in metal one (M1) 150, an output pin labeled as "OUT" in M1 150, a power supply pin labeled as "VDD" in metal zero (M0) 130 and a ground reference pin labeled as "GND" in M0 130. Cell layout 102 does not include posts in M1 150 for the power and ground connections.

Shown on the right, cell layout 104 is another embodiment of an inverter without placement of metal one (Metal1 or M1) posts for power and ground connections. Cell layout 104 utilizes the same number of vertical metal gates 110 as cell layout 102. In some embodiments, cell layouts 102 and 104 are part of a cell layout library. In other embodiments, cell layouts 102 and 104 are custom layout cells for particular areas of a chip design. A cell layout of an inverter with inefficient placement metal one (Metal1 or M1) posts for a power and ground connections is shown later in standard cell layout 300 (of FIG. 3), which has an extra metal gate 110 to provide area for adding posts in M1 150.

In the illustrated embodiment, each of cell layout 102 and cell layout 104 has posts in Metal0 130, which includes no vias to any upper metal layers. Global routing for cell layouts 102 and 104 in a floorplan with neighboring cells uses Metal0 130, rather than using the typical Metal2 170. Cell layout 104 has the same amount of on-die area as cell layout 102 despite cell layout 104 includes routing for power connections with neighboring cells. Typically, the vertical metal one (Metal1 or M1) 150 is used for routing to provide flexible connections to horizontal metal 2 (M2 or Metal2) 170 for creating power and ground connections with neighboring cells. However, here, cell layout 104 does not use any vertical posts in Metal1 150 or horizontal posts in Metal2 170 for power connections. For cell layout 104, power posts in M0 130 of cell layout 104 are extended to the boundary edge of the cell layout 104 of the inverter to allow routing in M0 to neighboring cells. With the use of the M0 extensions 132, in an embodiment, the routing in M0 130 is accomplished through abutment with power reference posts in M0 130 of a neighboring cell.

The layout design rule checks (DRCs) are revised to allow the use of the M0 extensions 132. The software layout tool performing the layout has the DRCs revised. The place-and-route tool places the cells so that the cells abut one another, but the place-and-route tool does not verify the layout within the cells. Typically, horizontal routes in Metal0 130 end prior to the cell boundary edge and at least a non-zero threshold distance from the cell boundary edge.

Although cell layout 104 illustrates layout techniques for an inverter, the layout techniques can be used for other standard cells to prevent increasing on-die area when power connections are added. For example, the layout techniques can be used for any standard cell in a layout library with a layout containing a higher pin count than a number of metal gates 110. In other words, the layout techniques can be used for any standard cell with a number of metal gates less than a sum of the one or more input nodes, the one or more output nodes and the power and ground connections.

Located at the top of each of the cell layouts 102 and 104 are the p-type metal oxide semiconductor (PMOS) field effect transistors (FETS) (pfets). The n-type MOS FETS (nfets) are located at the bottom of each of the cell layouts 102 and 104. Accordingly, each of cell layout 102 and cell layout 104 uses power pins labeled as "VDD" at the top and the ground pins labeled as "GND" at the bottom. In some embodiments, the devices in the standard cell layout 100 are fabricated by one of the immersion lithography techniques, the double patterning technique, the extreme ultraviolet lithography (EUV) technique, and the directed self-assembly (DSA) lithography technique. In some embodiments, the EUV technique provides more flexibility relative to via and contact modules relative to other techniques.

In various embodiments, the devices (transistors) in the cell layouts 102 and 104 are non-planar devices (transistors). Non-planar transistors are a recent development in semiconductor processing for reducing short channel effects. Tri-gate transistors, Fin field effect transistors (FETs) and gate all around (GAA) transistors are examples of non-planar transistors. As shown, the cell layouts 102 and 104 use metal gate 110 in a vertical direction, trench silicide contacts 120 for the source and drain regions in the vertical direction, metal 0 (M0 or Metal0) 130 for local interconnections in the horizontal direction, contacts 140 for connecting the metal gate 110 to Metal0 130 and contacts 142 for connecting the trench silicide contact 120 to Metal0 130.

In various embodiments, titanium nitride (TiN) is used for the metal gate 110. In a fabrication process, the metal gate 110 is provided around nanowires of non-planar transistors by deposition followed by chemical mechanical polishing steps. The cell layouts 102 and 104 additionally use metal 1 (M1 or Metal1) 150 for local interconnections in the vertical direction and vias 152 for connecting the horizontal interconnect Metal0 130 to the vertical interconnect Metal1 150. Vias 160 are used for connecting vertical Metal1 150 to horizontal Metal2 170. However, cell layouts 102 and 104 do not use vias 160 or Metal2 170.

As described earlier, cell layout 102 has four pins, which include the input pin "IN" in metal one (M1) 150, the output pin "OUT" in M1 150, the power supply pin "VDD" in metal zero (M0) 130 and the ground reference pin "GND" in M0 130. Cell layout 102 has three metal gates 110. The ratio of total pins to metal gates 110 is above unity, since the ratio is four pins to three metal gates 110. Routing the power reference pins to neighboring cells is still needed for cell layout 102. Typically, power reference pins are routed in M1 150. For example, a software place-and-route tool would place a copy of cell layout 102 on the die of a chip design, and later attempt to place a vertical post in Metal1 150 for VDD, a via 160 for connecting the vertical power post in Metal1 150 to horizontal Metal2 170, and then route the power horizontal Metal2 170 to the power horizontal Metal2 170 of a neighboring cell. Similar steps would be performed by the place-and-route tool for the ground reference connections. However, standard cells like cell layout 102 do not have enough vertical Metal1 (M1) channels to add the power posts in Metal1 150 without expanding the layout and on-die area by adding an extra metal gate 110 to create an extra vertical M1 channel.

Similar to cell layout 102, cell layout 104 has four pins, which include the input pin "IN" in Metal1 (M1) 150, the output pin "OUT" in M1 150, the power supply pin "VDD" in Metal0 (M0) 130 extended to the cell boundary and the ground reference pin "GND" in M0 130 extended to the cell boundary. Cell layout 104 also has three metal gates 110. The ratio of total pins to metal gates 110 is above unity, since the ratio is four pins to three metal gates 110. Rather than using horizontal Metal1 170 for routing power reference posts to neighboring cells, routing the power reference posts for cell layout 104 to neighboring cells is done by the extending M0 posts 132 to the cell boundary.

No power posts in M1 150 are added in cell layout 104 for routing the power reference pins labeled "VDD" and "GND," so no additional metal gates 110 are added to expand the on-die area of cell layout 104 to include the power posts in M1 150. Should a vertical post in Metal1 150 be added to connect power to a horizontal post in Metal2 170, then an extra metal gate 110 would be added to satisfy design rules. Design rules prevent a vertical post in Metal1 150 from being within a threshold distance of the cell boundary edge. In addition, vertical posts in Metal1 150 need to be within a threshold distance of vertical metal gates 110. The design rules are set by the fabrication process. The extra metal gate 110 would provide extra distance between the vertical post in Metal1 150 and the cell boundary edge. The type of routing using an extension of the horizontal posts in Metal0 130 is illustrated in the upcoming cell layout 200 (of FIG. 2).

Figure 2:
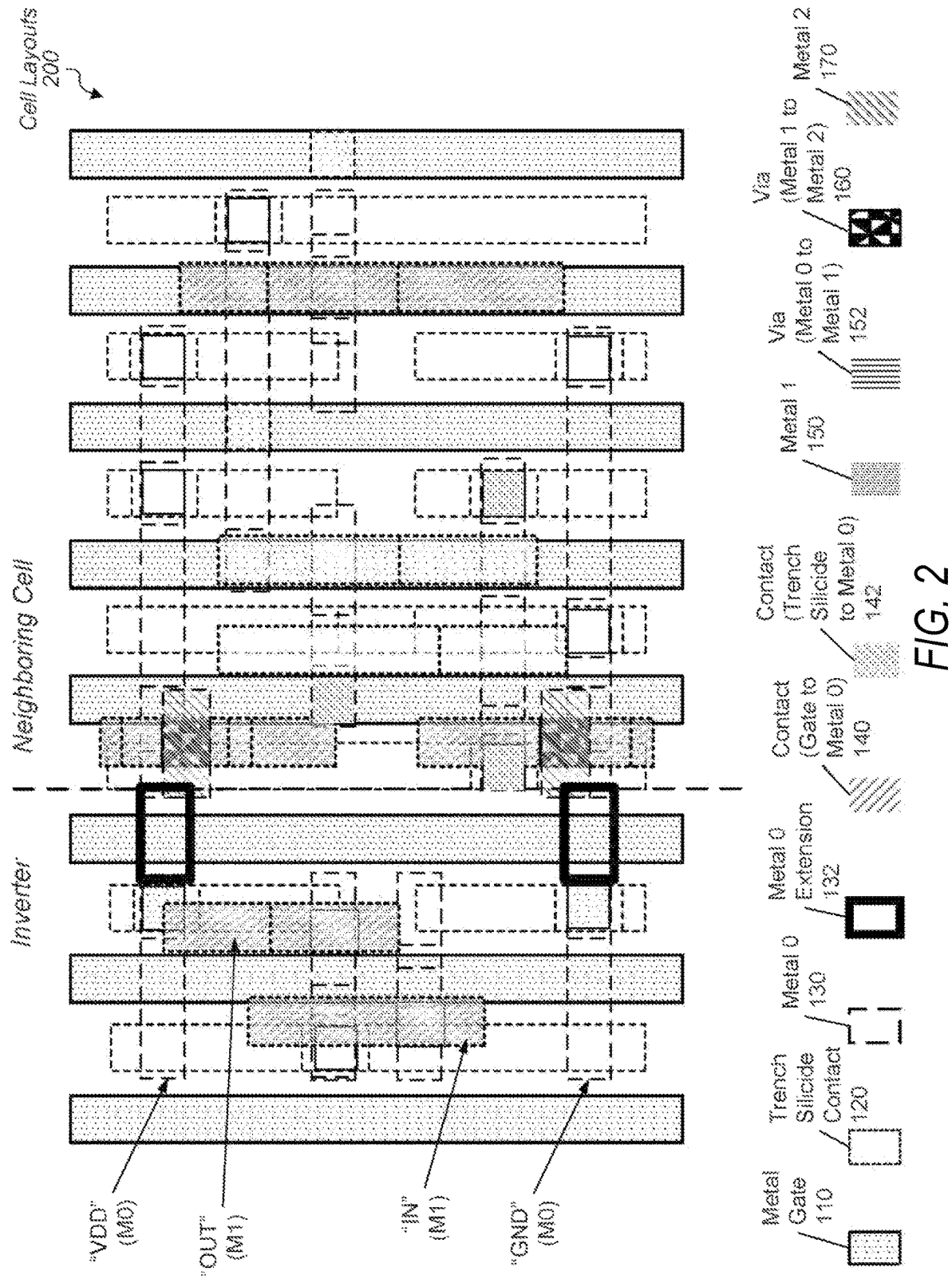
FIG. 2 is a generalized diagram of a top view of a standard cell layout for an inverter placed with a neighboring complex logic gate.

Referring to FIG. 2, a generalized block diagram of a top view of cell layouts 200 is shown. Layout elements described earlier are numbered identically. Similar to the cell layouts 102 and 104, the post locations for the power connections are at the top and the post connections for ground connections at the bottom. As shown, cell layouts 200 include an inverter on the left and any one of a variety of complex gates on the right as a neighboring cell. In various embodiments, each of the inverter and the neighboring cell is a standard cell in a cell layout library. In other embodiments, one or more of the inverter and the neighboring cell is a custom designed cell, which is separate from the cell layout library.

Here in layouts 200, each of the inverter and the neighboring cell have power supply tracks and ground reference tracks aligned with one another in horizontal posts in Metal0 130. In various embodiments, a software place-and-route tool placed the inverter on the left of the complex gate on the die of a chip design. In one embodiment, the inverter already has horizontal M0 extensions 132 for the power and ground connections. The layout design rule checks (DRCs) performed by a layout tool are revised to allow the use of the M0 extensions 132. When the software place-and-route tool placed the inverter on the left, the power and ground connections are made by abutment between the inverter on the left and the complex gate on the right.

In another embodiment, the cell layout for the inverter does not include horizontal M0 extensions 132 for the power and ground connections. However, the horizontal power and ground tracks in Metal0 130 are aligned with the horizontal power and ground tracks in Metal0 130 in the complex gate. Therefore, the place-and-route tool is modified to place the inverter to the left of the complex gate and add the extra horizontal route in Metal0 130, rather than the horizontal Metal2 170, between the power connections of the inverter and the complex gate. Additionally, the place-and-route tool adds the extra horizontal route in Metal0 130, rather than the horizontal Metal2 170, between the ground connections of the inverter and the complex gate.

In some embodiments, layout rules allow the power connections to be placed on a horizontal track below the currently used horizontal track in Metal0 130 shown in cell layout 200. Additionally, in some embodiments, layout rules allow the ground connections to be placed on a horizontal track above the currently used horizontal track in Metal0 130 shown in cell layout 200. Therefore, four different variations of the inverter cell layout are possible for placement of the power and ground connections. However, there are cells in the layout cell library that do not have an available track in Metal0 to reach the cell boundary edge. The power and ground connections need to be routed in an upper metal layer such as a post in Metal2 150.

An additional cell layout for the inverter using posts in Metal2 150 is also used in the cell layout library. Therefore, a fifth variation of the inverter cell layout is possible for placement of the power and ground connections. In an embodiment, the placement rules for the place-and-route tool are modified to determine which of the five variations of the inverter cell to place next to a particular complex gate based on the on the power and ground connections in the complex gate. In other embodiments where the number of additional available tracks in Metal0 130 for power and ground connections is greater than two, the number of possible variations of the inverter cell layout increases.

Once determined, the placement-and-route tool selects one of the multiple variations of the inverter cell to place to the left of the complex gate so that the power and ground connections are aligned between the inverter and the complex gate. In one embodiment, the cell layout for the inverter uses the horizontal extensions 132 in Metal0, and routing is performed by abutment. In another embodiment, the cell layout for the inverter does not use the horizontal extensions 132 in Metal0, and routing is performed by the place-and-route tool adding the extra horizontal route in Metal0 130, rather than the horizontal Metal2 170, between the power and ground connections of the inverter and the complex gate.

As described earlier, although the above layout techniques and place-and-route techniques are described for an inverter, these techniques can be used for other standard cells in the layout library. For example, these techniques can be used for other standard cells which have a greater number of pins than a number of metal gates 110. Other examples of standard cells in a layout cell library with this ratio greater than unity are a 2-input Boolean NAND gate and a 2-input Boolean NOR gate. In one example, there are three logic gates, each with four combinations for placement of the power and ground connections. Therefore, there are twelve different standard cell layouts to support in the layout library, each using horizontal posts in Metal0 130, rather than horizontal posts in Metal2 170, for power connections.

Figure 3:
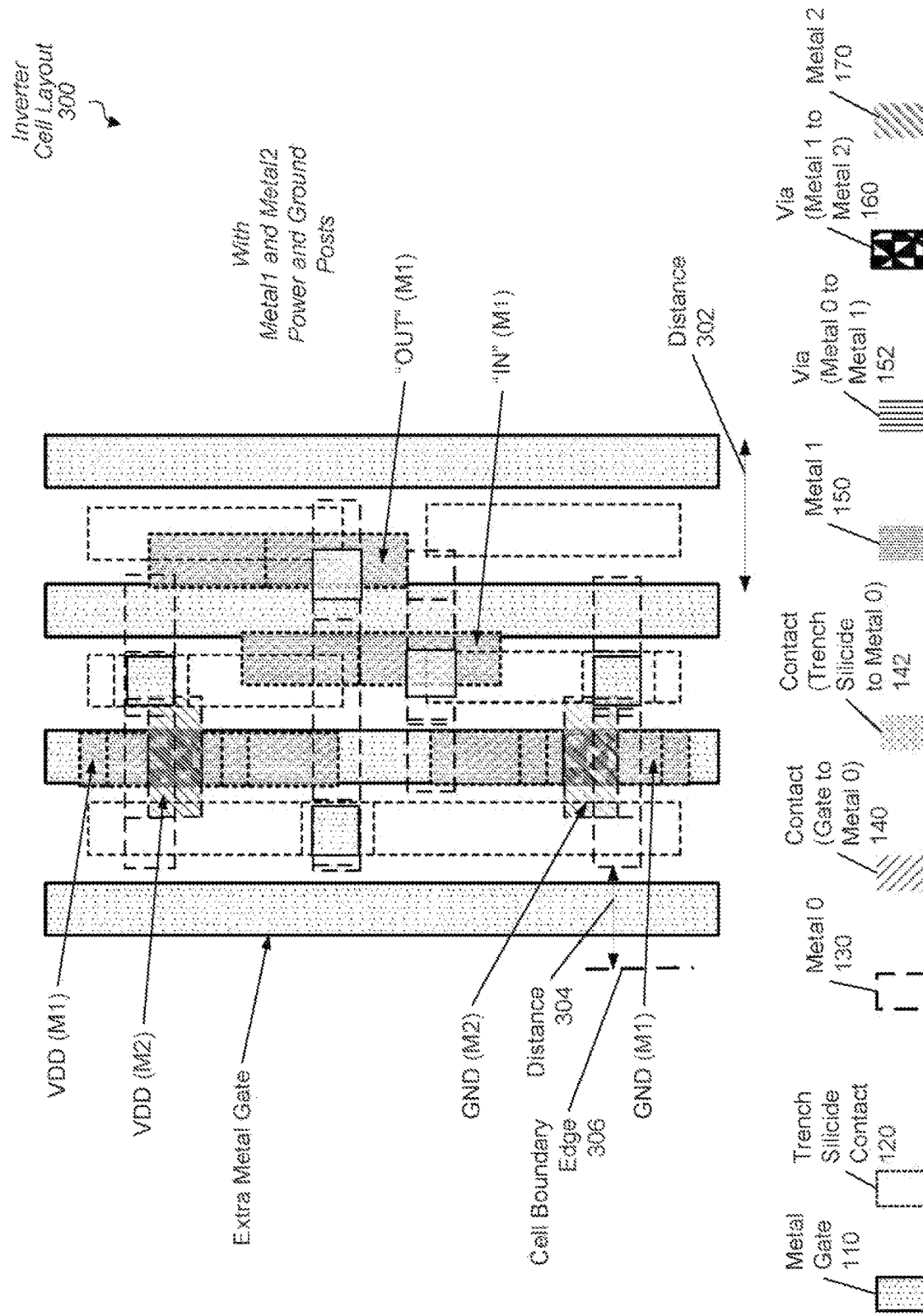
FIG. 3 is a generalized diagram of a top view of a standard cell layout for an inverter with power and ground connections in metal one and metal two.

Referring to FIG. 3, a generalized block diagram of a top view of a multi-cell layout 300 is shown. Layout elements described earlier are numbered identically. Similar to the cell layouts 102, 104 and 200, the post locations for the power connections are at the top and the post connections for ground connections at the bottom. In contrast to the cell layouts of an inverter in cell layouts 102, 104 and 200, cell layout 300 has power supply tracks and ground reference tracks in horizontal posts in Metal2 170. Via 160 is used for connecting the vertical power post in Metal1 150 to a horizontal post in Metal2 170, which can then be routed to another power post in horizontal Metal2 170 of a neighboring cell (not shown). Via 160 is used in a similar manner for the ground connections.

Without the use of extensions in Metal0 130 and without the use of modifications to the place-and-route tool, an extra metal gate 110 is placed to create space for the tracks in Metal1 (M1) 150 for routing the power and ground connections. As shown, cell layout 300 increases in area by the distance 302 compared to the earlier cell layouts 102, 104 and the inverter in cell layout 200. The distance 302 is between the left edges of the added metal gate 110 and the original left-most metal gate 110. An extra trench silicide contact 120 is also placed. The added metal gate 110 satisfies DRCs based on a fabrication process that specifies a minimum distance between a vertical post in Metal1 150 and a metal gate 110. The distance 304 shows the threshold distance between the boundary edge 306 of cell layout 300 and the end of a horizontal track in Metal0 130.

Figure 4:
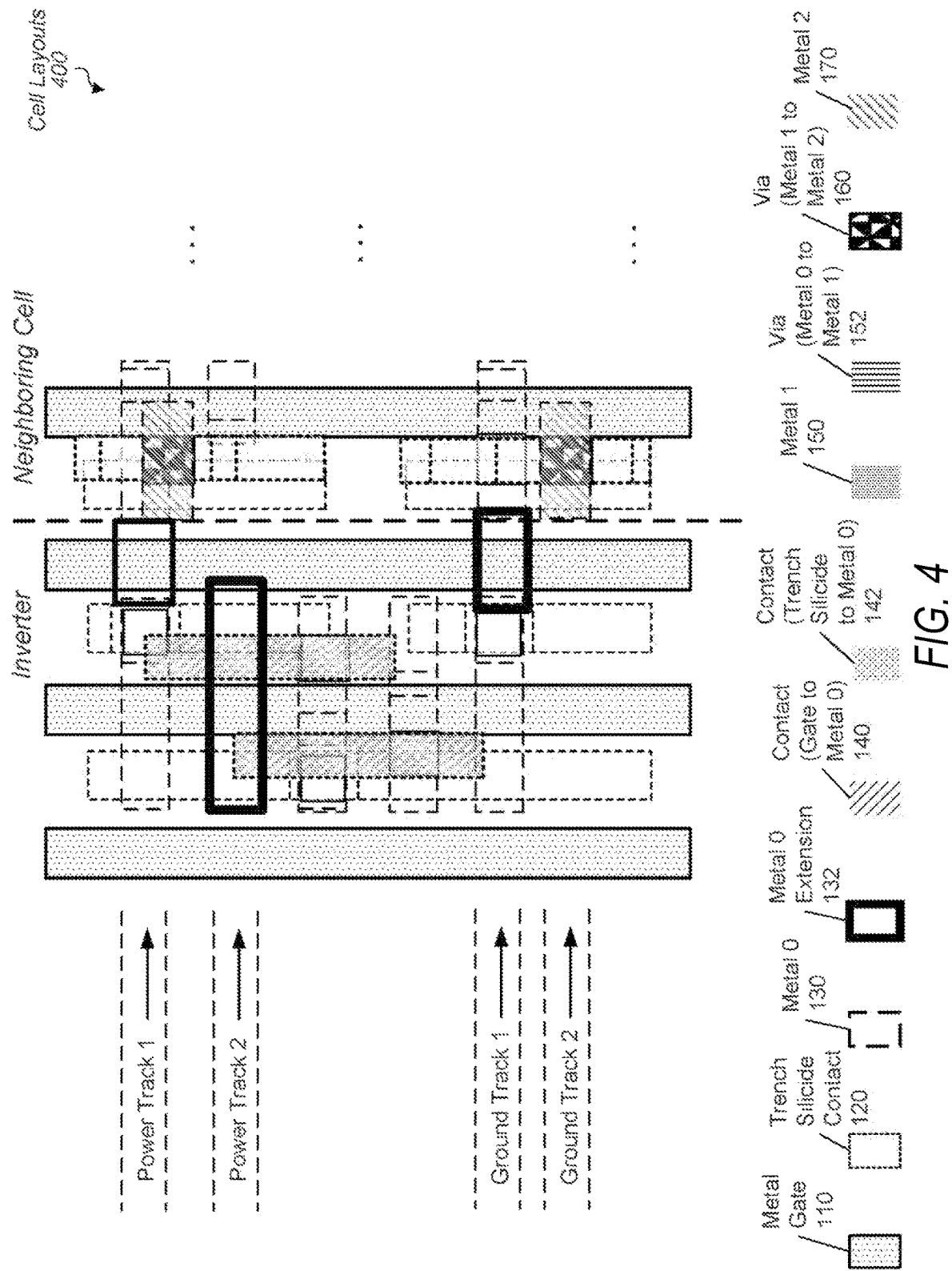
FIG. 4 is a generalized diagram of a top view of a standard cell layout for an inverter.

Referring to FIG. 4, a generalized block diagram of a top view of a cell layout 400 is shown. Layout elements described earlier are numbered identically. Similar to the cell layouts 102 and 104, the post locations for the power connections are at the top and the post connections for ground connections at the bottom. As shown, cell layouts 400 include an inverter on the left and any one of a variety of complex gates on the right as a neighboring cell. In various embodiments, each of the inverter and the neighboring cell is a standard cell in a cell layout library. In other embodiments, one or more of the inverter and the neighboring cell is a custom designed cell, which is separate from the cell layout library. Here in cell layouts 400, the inverter and the neighboring cell have power supply tracks and ground reference tracks aligned with one another in horizontal posts in Metal0 130. For example, the tracks labeled as "Power Track 1" and "Ground Track 1" indicate the alignment for the inverter and the complex gate.

In various embodiments, a software place-and-route tool placed the inverter on the left of the complex gate on the die of a chip design. In one embodiment, the inverter already has horizontal M0 extensions 132 for the power and ground connections. The layout design rule checks (DRCs) performed by a layout tool are revised to allow the use of the M0 extensions 132. As shown, cell layouts 400 additionally include two other tracks for routing power and ground connections. In an embodiment, another variation of the inverter uses these other tracks labeled as "Power Track 2" and "Ground Track 2" for the power and ground connections. As described earlier, there can be multiple different variations of the inverter cell layout for placement of the power and ground connections.

Figure 5:
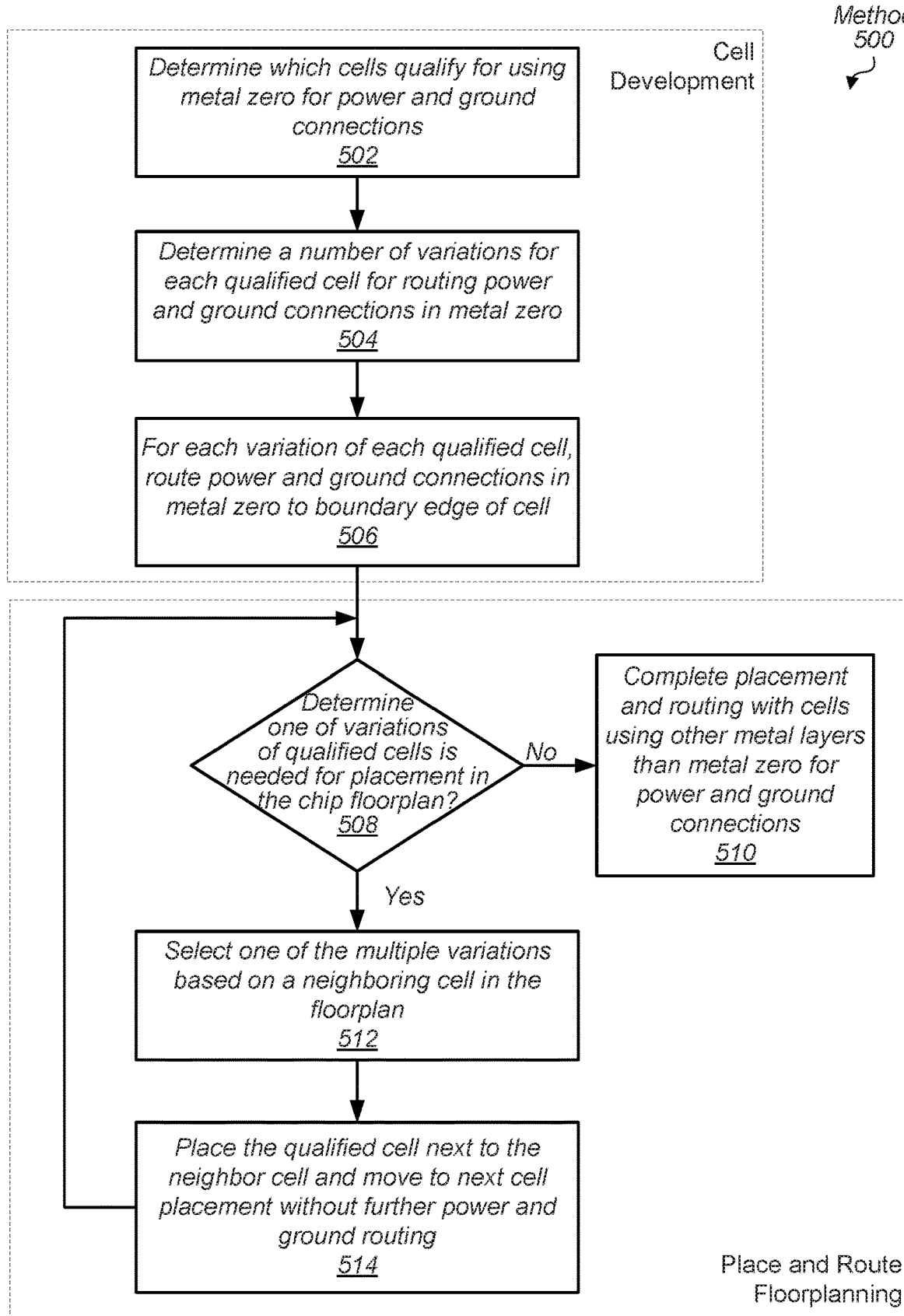
FIG. 5 is a generalized diagram of a method for creating power grid connections for a standard cell layout.

Referring now to FIG. 5, one embodiment of a method 500 for creating power grid connections for a cell layout is shown. For purposes of discussion, the steps in this embodiment (as well as in FIG. 6) are shown in sequential order. However, in other embodiments some steps occur in a different order than shown, some steps are performed concurrently, some steps are combined with other steps, and some steps are absent.

Which cells qualify for using metal zero for power and ground connections are determined (block 502). In an embodiment, any standard cell or custom cell qualifies when the cell has a number of metal gates less than a sum of the one or more input nodes, the one or more output nodes and the power and ground connections for the cell. In some embodiments, the cells that qualify include one or more of an inverter, a 2-input Boolean NAND gate and a 2-input Boolean NOR gate.

A number of variations for each qualified cell are determined for routing power and ground connections in metal zero (block 504). In various embodiments, each of the posts in Metal0 (M0) for the power and ground connections have multiple available tracks for routing. The number of variations is equal to the number of combinations to use for routing power and ground connections with the available tracks. For example, if there are two available tracks in Metal0 for power in a qualified cell and two available tracks in Metal0 for the ground reference in the qualified cell, then there are four possible variations for the qualified cell for routing power and ground connections in metal zero.

For each variation of each qualified cell, power and ground connections are routed in metal zero to the boundary edge of the cell (block 506). In one embodiment, the cell layout library is updated with new standard cells. The next steps are for floorplanning a chip design. A place-and-route tool is used to select standard cells from the library, place the standard cells next to neighboring cells, and globally route the power and ground connections. If no variations of qualified cells is needed for placement in the chip floorplan ("no" branch of the conditional block 508), then placement and routing is completed with cells using other metal layers than metal zero for power and ground connections (block 510). For example, in some embodiments, the metal two (M2) layer is used for the power and ground connections.

If a variation of one of the qualified cells is needed for placement in the chip floorplan ("yes" branch of the conditional block 508), then one of the multiple variations is selected based on a neighboring cell in the floorplan (block 512). The selected variation of the qualified cell is placed next to the neighbor cell and the place-and-route tool moves to the next cell placement without further power and ground routing (block 514). The power and ground connections are made in metal zero by abutment of the selected qualified cell and its neighboring cell.

Figure 6:
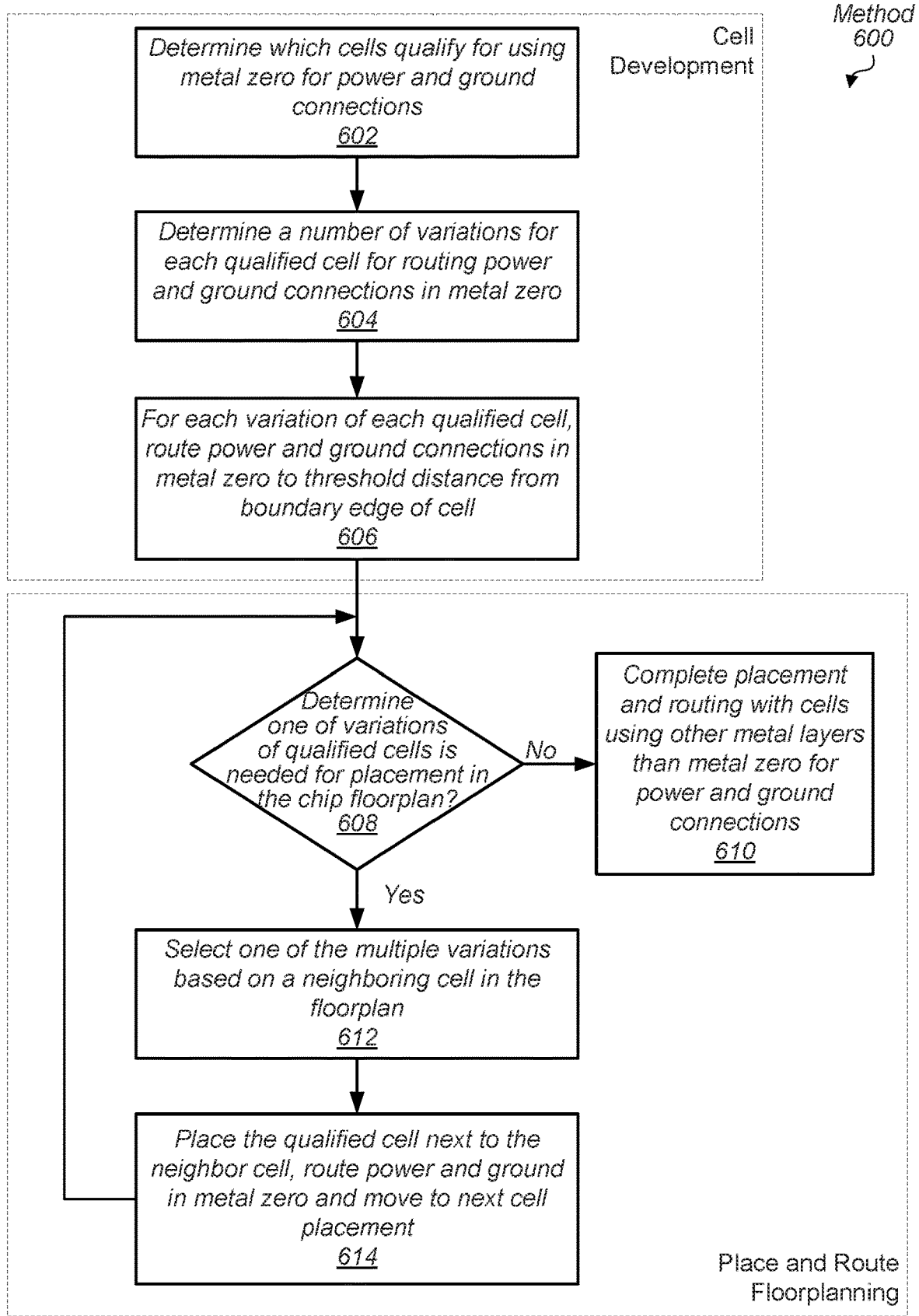
FIG. 6 is a generalized diagram of a method for creating power grid connections for a standard cell layout.

Referring now to FIG. 6, another embodiment of a method 600 for creating power grid connections for a standard cell layout is shown. Which cells qualify for using metal zero for power and ground connections are determined (block 602). As described earlier, in an embodiment, any standard or custom cell qualifies with a number of metal gates less than a sum of the one or more input nodes, the one or more output nodes and the power and ground connections for the standard cell. In some embodiments, the cells that qualify include one or more of an inverter, a 2-input Boolean NAND gate and a 2-input Boolean NOR gate. In various embodiments, the number of uses of standard cells for an inverter, a 2-input Boolean NAND gate and a 2-input Boolean NOR gate in a chip floorplan can be appreciable in many designs.

A number of variations for each qualified cell are determined for routing power and ground connections in metal zero (block 604). As described earlier, the number of variations is equal to the number of combinations to use for routing power and ground connections with the available tracks. In one example, if there are two available tracks in Metal0 for power in a qualified cell and two available tracks in Metal0 for the ground reference in the qualified cell, then there are four possible variations for the qualified cell for routing power and ground connections in metal zero.

For each variation of each qualified cell, power and ground connections are routed in metal zero to a threshold distance from boundary edge of cell (block 606). In one embodiment, the cell layout library is updated with new standard cells. The next steps are for place-and-route tool to select standard cells from the library, place the standard cells next to neighboring cells, and globally route the power and ground connections. If no variations of qualified cells is needed for placement in the chip floorplan ("no" branch of the conditional block 608), then placement and routing is completed with cells using other metal layers than metal zero for power and ground connections (block 610). For example, in some embodiments, the metal two (M2) layer is used for the power and ground connections.

If a variation of one of the qualified cells is needed for placement in the chip floorplan ("yes" branch of the conditional block 608), then one of the multiple variations is selected based on a neighboring cell in the floorplan (block 612). The selected variation of the qualified cell is placed next to the neighbor cell, the place-and-route tool routes power and ground connections in metal zero between the qualified cell and the neighbor cell, and the place-and-route tool moves to the next cell placement (block 614).

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A cell layout comprising:
   one or more input nodes in a first metal layer;
   one or more output nodes in the first metal layer; and
   one or more power reference pins in a second metal layer below the first metal layer routed in only a first direction in the second metal layer, wherein the second metal layer is used for local interconnections in only the first direction; and
   a power post of the one or more power reference pins in the second metal layer, wherein the power post:
      has at least one end not routed to a boundary edge of the cell layout; and
      includes no vias to any upper metal layers.

2. The cell layout as recited in claim 1, wherein one end of the power post is routed in the second metal layer to a boundary edge of the cell layout.

3. The cell layout as recited in claim 1, wherein one end of the power post is connected in the second metal layer to a power post of a neighboring cell by abutment and another end of the power post is not connected to a power post of a neighboring cell by abutment.

4. The cell layout as recited in claim 1, further comprises a number of metal gates less than a sum of the one or more input nodes, the one or more output nodes and the power and ground connections.

5. The cell layout as recited in claim 1, further comprising a first power supply track closer to a top of the cell layout or closer to a bottom of the cell layout than a second power supply track comprising the power post, wherein the first power supply track is available for power connection in addition to the second track.

6. The cell layout as recited in claim 1, further comprising:
   one or more ground reference pins in the second metal layer routed in only the first direction in the second metal layer; and
   a ground reference post of the one or more ground reference pins in the second metal layer, wherein the ground reference post:
      has at least one end not routed to a boundary edge of the cell layout; and
      includes no vias to any upper metal layers.

7. The cell layout as recited in claim 6, wherein one end of the ground reference post is routed in the second metal layer to a boundary edge of the cell layout.

8. The cell layout as recited in claim 1, wherein:
   the first metal layer is a metal layer used for interconnections in only a second direction different from the first direction.

9. A method comprising:
   forming one or more input nodes in a first metal layer for a cell;
   forming one or more output nodes in the first metal layer for the cell; and
   forming one or more power reference pins in a second metal layer below the first metal layer routed in only a first direction in the second metal layer, wherein the second metal layer is used for local interconnections in only the first direction; and
   forming a power post of the one or more power reference pins in the second metal layer, wherein the power post:
      has at least one end not routed to a boundary edge of the cell layout; and
      includes no vias to any upper metal layers.

10. The method as recited in claim 9, further comprising routing one end of the power post in the second metal layer to a boundary edge of the cell layout.

11. The method as recited in claim 9, further comprising connecting one end of the power post in the second metal layer to a power post of a neighboring cell by abutment and another end of the power post is not connected to a power post of a neighboring cell by abutment.

12. The method as recited in claim 9, placing a number of metal gates in the cell less than a sum of the one or more input nodes, the one or more output nodes and the power and ground connections.

13. The method as recited in claim 9, further comprising forming the power post in a first power supply track closer to a top of the cell layout or closer to a bottom of the cell layout than a second power supply track comprising the power post, wherein the first power supply track is available for power connection in addition to the second track.

14. The method as recited in claim 9, further comprising:
forming one or more ground reference pins in the second metal layer routed in only the first direction in the second metal layer; and
forming a ground reference post of the one or more ground reference pins in the second metal layer, wherein the ground reference post:
has at least one end not routed to a boundary edge of the cell layout; and
includes no vias to any upper metal layers.

15. The method as recited in claim 14, further comprising routing one end of the ground reference post in the second metal layer to a boundary edge of the cell layout.

16. The method as recited in claim 9, wherein:
the first metal layer is a metal layer used for interconnections in only a second direction different from the first direction.

17. A semiconductor integrated circuit comprising:
a first cell configured to provide a first functionality;
a second cell neighboring the first cell configured to provide a second functionality;
wherein the first cell comprises:
one or more input nodes in a first metal layer;
one or more output nodes in the first metal layer; and
one or more power reference pins in a second metal layer below the first metal layer routed in only a first direction in the second metal layer, wherein the second metal layer is used for local interconnections in only the first direction; and
a power post of the one or more power reference pins in the second metal layer, wherein the power post:
has at least one end not routed to a boundary edge of the first cell; and
includes no vias to any upper metal layers.

18. The semiconductor integrated circuit as recited in claim 17, wherein one end of the power post is routed in the second metal layer to a boundary edge of the first cell.

19. The semiconductor integrated circuit as recited in claim 17, wherein:
the semiconductor integrated circuit further comprises a third cell configured to provide a third functionality; and
one end of the power post is connected in the second metal layer to a power post of the neighboring second cell by abutment and another end of the power post is not connected to a power post of the neighboring third cell by abutment.

20. The semiconductor integrated circuit as recited in claim 17, wherein the first cell comprises a number of metal gates less than a sum of the one or more input nodes, the one or more output nodes and the power and ground connections.

* * * * *